(12) United States Patent
Shin et al.

(10) Patent No.: US 10,330,073 B2
(45) Date of Patent: Jun. 25, 2019

(54) FLOATING BODY FOR TIDAL CURRENT POWER GENERATION AND POWER GENERATION METHOD USING SAME

(71) Applicant: Dong Ryun Shin, Seoul (KR)

(72) Inventors: Dong Ryun Shin, Seoul (KR); Lyun Sup Shin, Seoul (KR)

(73) Assignee: Dong Ryun Shin, Seoul (KR)

( * ) Notice: Subject to any disclaimer, the term of this patent is extended or adjusted under 35 U.S.C. 154(b) by 75 days.

(21) Appl. No.: 15/310,435

(22) PCT Filed: May 12, 2015

(86) PCT No.: PCT/KR2015/004705
§ 371 (c)(1),
(2) Date: Nov. 10, 2016

(87) PCT Pub. No.: WO2015/174706
PCT Pub. Date: Nov. 19, 2015

(65) Prior Publication Data
US 2017/0074232 A1 Mar. 16, 2017

(30) Foreign Application Priority Data

May 13, 2014 (KR) .................. 10-2014-0057109

(51) Int. Cl.
| | |
|---|---|
| *F03B 7/00* | (2006.01) |
| *F03B 13/26* | (2006.01) |
| *F03B 13/12* | (2006.01) |
| *F03B 17/06* | (2006.01) |

(52) U.S. Cl.
CPC ............. *F03B 13/264* (2013.01); *F03B 7/00* (2013.01); *F03B 13/12* (2013.01); *F03B 17/06* (2013.01); *Y02E 10/223* (2013.01); *Y02E 10/226* (2013.01); *Y02E 10/28* (2013.01); *Y02E 10/38* (2013.01)

(58) Field of Classification Search
CPC .. F03B 7/00; F03B 17/06; F03B 13/12; F03B 13/264; Y02E 10/223; Y02E 10/28
See application file for complete search history.

(56) References Cited

FOREIGN PATENT DOCUMENTS

| | | |
|---|---|---|
| AU | 2007200888 B1 | 9/2007 |
| CN | 102628418 A | 8/2012 |
| CN | 103114962 A | 5/2013 |
| GB | 2502166 A | 11/2012 |

(Continued)

*Primary Examiner* — Abiy Teka
(74) *Attorney, Agent, or Firm* — Maschoff Brennan

(57) ABSTRACT

A floating body for tidal current power generation of the present invention comprises: a power generation unit comprising a water wheel and a power generator connected to the water wheel; and a body part provided with tidal current inlet and outlet paths having a cross-sectional area that is gradually reduced from the front and rear surfaces thereof toward the water wheel. According to the present invention, a plurality of floating bodies for tidal current power generation are disposed in parallel so that the longitudinal direction of the tidal current inlet and outlet paths coincides with the direction of the tidal current in a terrain such as a strait with a narrow width. In addition, provided is a power generation method which is a method for adjusting the draft of a floating body for tidal current power generation depending on the flow velocity of the tidal current, thereby smoothly performing power generation even when the flow velocity of the tidal current becomes slower as tidal stand nears.

5 Claims, 4 Drawing Sheets

(56) References Cited

FOREIGN PATENT DOCUMENTS

| | | |
|---|---|---|
| JP | H07 259064 A | 10/1995 |
| JP | 07-301171 A | 11/1995 |
| JP | 4759092 B1 | 8/2011 |
| KR | 10-0762375 B1 | 9/2007 |
| KR | 10-2009-0029618 A | 12/2009 |
| KR | 10-2008-0087770 A | 12/2010 |
| KR | 10-2012-0075251 A | 12/2010 |
| KR | 10-1039080 B1 | 6/2011 |
| KR | 10-1222187 | 1/2013 |
| KR | 10-1241134 B1 | 3/2013 |
| KR | 20-2013-0001545 U | 1/2014 |
| RU | 2049924 C1 | 12/1995 |

FLOATING BODY FOR TIDAL CURRENT POWER GENERATION AND POWER GENERATION METHOD USING SAME

TECHNICAL FIELD

The present invention relates to a floating body for tidal current power generation, which generates power using the tidal current, and more particularly, to a floating body for tidal current power generation, which can efficiently use the tidal current in a place where the tidal current is strong, such as a strait or waterway, and a power generation method using the plurality of floating bodies.

BACKGROUND ART

As the industry develops, the amount of power generated using fossil fuels increases, and accordingly, environmental problems such as global warming arise. In addition, there is a need for development of new energy sources substituting for the fossil fuels due to the limited fossil fuel reserves. To solve these problems, various power generation methods using water, nuclear energy, solar heat, tidal current, or the like have been proposed and have become commercialized.

Since Korea has the shores having a large tidal range, Korea has a topographical advantage in generating tidal power. In particular, in the western sea and the southern sea of Korea, which have many groups of islands, there are many straits and waterways in which strong tidal currents are generated between islands and land or between islands. Therefore, there is great potential for tidal current power generation using this topographical advantage.

For example, in the case of the Uldolmok strait, known as having the fastest tidal current in Korea, the highest speed of the tidal current when the tide is in and out reaches 5-6 m/sec, which is three times higher than in the normal sea, and thus the Uldolmok strait is evaluated as having the optimum condition for tidal current power generation.

Typical tidal current power generation methods are divided into a method of installing a tower-shaped structure provided with a power generation device therein in the sea, a method of installing a structure having an axial-flow type blade embedded therein in the bottom or middle of the sea, and a method of using a floating body like a ship having a power generation water wheel installed therein.

The tower-shaped structure having the tidal current power generation device embedded therein is disclosed in Korean Patent Registration No. 10-0762375.

To firmly fix the tower-shaped structure to the bottom of the sea, an undersea foundation should be established. However, in a strait having the strong tidal current, there are disadvantages that it is very difficult to establish the undersea foundation and much cost is required. In addition, since the structure is always fixed in the water having the strong tidal current, materials easily break off after being installed, which causes a defect, and it is very difficult to maintain and repair the structure.

The method of installing the structure having the propeller type blade power generation device embedded therein in the bottom or middle of the sea is disclosed in Korean Patent Registration No. 10-1222187 and Korean Patent Publication No. 10-2012-0075251.

These devices have the same problems as the tidal current power generation device installed in the tower-shaped structure in that the structure having a power generation device installed therein should be fixed to the bottom of the sea The method of using the floating body like a ship having a power generation water wheel installed therein is disclosed in Japanese Patent Publication No. H7-301171 and Korean Patent Registration No. 10-1039080, and a normal configuration of this method is that a water wheel for using water flowing down the floating body or along the side surface of the floating body is installed.

Referring to the related-art methods in detail, the technology disclosed in Japanese Patent Publication No. H7-301171 is installing a water wheel between a pair of boat-shaped hollows having a predetermined gap therebetween, and using the water wheel in a narrow space such as a tailrace of a dam. Since the disclosed structure is usable only on a surface layer of water, it is difficult to apply this method to a relatively deep point of water such as a strait. In addition, since the pair of boat-shaped hollows are simply connected to a connection support, the hollows are likely to be damaged in a harsh environment such as sea.

The technology disclosed in Korean Patent Registration No. 10-1039080 is moving a ship provided with a power generation device to a place where a dike for tidal current power generation will be constructed and then filling the ship with seawater, dropping down the ship to a waterway, and fixing the ship to the bottom. Therefore, there is an advantage that power generation equipment enabling the ship to serve as a dike can be established. However, since this technology enables the ship to serve as a dike, there is a limitation to moving the ship when the ship is fixed in position and generates power, and there is a problem that it is difficult to install a power generation water wheel on the bottom of the ship since the ship is always in contact with water.

In addition, typical related-art tidal current power generation devices including the above-mentioned related-art technologies smoothly generate power when the speed of the tidal current is fast, but there is a problem that efficiency of power generation is abruptly reduced when the speed of the tidal current is slow, for example, at the time of stand of tide. As described above, the related-art tidal current power generation methods have the problems that a uniform amount of power is not generated and efficiency of using tidal current energy is low.

DETAILED DESCRIPTION OF THE PRESENT DISCLOSURE

Technical Objects

The present invention has been developed in order to solve the above-described problems, and aims at providing a floating body for tidal current power generation, which has a water wheel type power generation device installed on a lower portion of a floating body of a barge type, and thereby is able to always generate power regardless of the ebb and flow, and can smoothly generate power even when the speed of the tidal current is slow as the stand of tide nears, and a power generation method using the same.

Technical Solving Means

According to the present invention to solve the above-described problems, a floating body for tidal current power generation includes: a power generation unit including a water wheel and a power generation device connected to the water wheel; and a body part including a tidal current inlet and outlet path 30 having a cross sectional area that is gradually reduced from the front and rear surfaces thereof toward the water wheel.

In addition, the body part may include: a space in which ballast water is stored; and a ballast water inlet and outlet for allowing ballast water to flow in and out therethrough. In this case, the space may be divided into a plurality of sealed regions to allow ballast water to flow in and out independently.

The body part may form the space therein and a ballast tank may be accommodated in the space. In addition, the body part may be configured to have a bottom surface located lower than a lowest location of the water wheel 15 by L.

The floating body for tidal current power generation of the present invention may generate power in response to a change in the flow speed of the tidal current in such a way that the plurality of floating bodies are arranged in parallel so that the longitudinal direction of a tidal current inlet and outlet path coincides with the direction of the tidal current in a terrain such as a strait with a narrow width, and the drafts of the floating bodies for tidal current power generation are adjusted according to the flow speed of the tidal current.

Advantageous Effect

The plurality of floating bodies for tidal current power generation suggested in the present invention are arranged in parallel, and the speed of the tidal current necessary for generating power is actively generated by adjusting the draft at a time when the speed of the tidal current is slow. Therefore, there is an advantage that power generation efficiency is maximized.

In addition, the present invention is formed in a tunnel shape such that the cross sectional area is gradually reduced from the tidal current inlet toward the water wheel. Therefore, there is an advantage that the tidal current flowing in affects the wing of the water wheel at reinforced high speed.

Since the body part of the present invention is formed as a single integrated type structure, it is easy to manufacture a device having high stiffness, and the device is not easily destroyed in a harsh environment such as a strait where the flow speed is very fast. In addition, the front surface or the rear surface of the body part affected by the tidal current form a substantially vertical plane and thus it is very easy to form the tidal current inlet path in multiple columns and multiple rows. Therefore, there is an advantage that the design can be changed adaptively according to generation capacity.

In addition, since the present invention is manufactured in the form of a floating body floating in the water, a strong foundation is not required to be established on the bottom of the sea and the device is not required to be fixed. The device can be easily moved when necessary and can be easily fixed by means of a normal anchor device such as an anchor. Of course, an anchor structure may be installed separately.

BEST MODE FOR EMBODYING THE INVENTION

The terms or words used in the descriptions and the claims should not be interpreted as typical or dictionary definitions only and should be interpreted as meaning and concepts coinciding with the technical idea of the present invention, based on the principle that the inventor can appropriately define the concepts of the terms in order to explain the inventor's invention in the best way.

Hereinafter, a floating body for tidal current power generation according to the present invention will be described in detail with reference to FIGS. 1 to 4.

Figure 1:
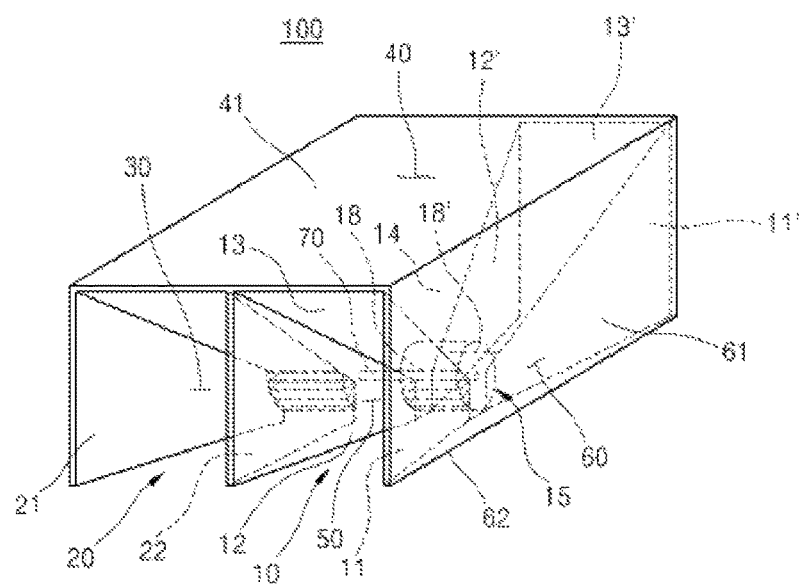
FIG. 1 is a perspective view showing main parts of a floating body for tidal current power generation according to the present invention.

FIG. 1 illustrates a perspective view showing an embodiment of main parts of a floating body 100 for tidal current power generation according to the present invention.

The floating body 100 for tidal current power generation of the present invention is mainly divided into a body part and a power generation unit. The configuration of the body part will be described with reference to FIGS. 1 to 4.

The body part has a rectangular housing shape which are enclosed by a top surface 41 and a right surface 61 and a left surface 61' which downwardly extend from the left and right sides of the top surface, and has a front surface and a rear surface opened.

Figure 4:
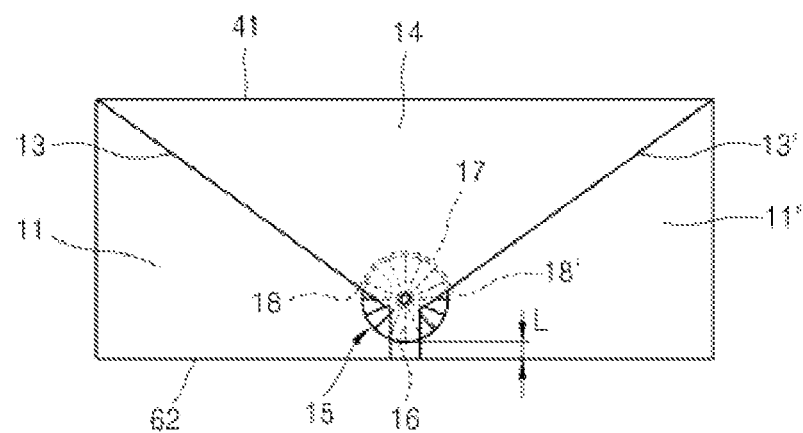
FIG. 4 is a view showing main parts as viewed from the side of the floating body for tidal current power generation according to the present invention.

The bottom surface of the body part includes: V-shaped upper inclined surfaces 13 and 13' which protrude downwardly from the upper portions of the front surface and the rear surface toward the center of the housing shape as shown in FIGS. 1 and 4; V-shaped right inclined surfaces 11 and 11' which protrude inwardly from the right sides of the front surface and the rear surface toward the center of the housing shape as shown in FIGS. 1 and 2; a pair of V-shaped middle inclined surfaces 12 and 12' and 22 and 22' which protrude inwardly from the middle of the front surface and the rear surface toward the center of the housing shape; and V-shaped left inclined surfaces 21 and 21' which protrude inwardly from the left sides of the front surface and the rear surface toward the center of the housing shape.

Figure 2:
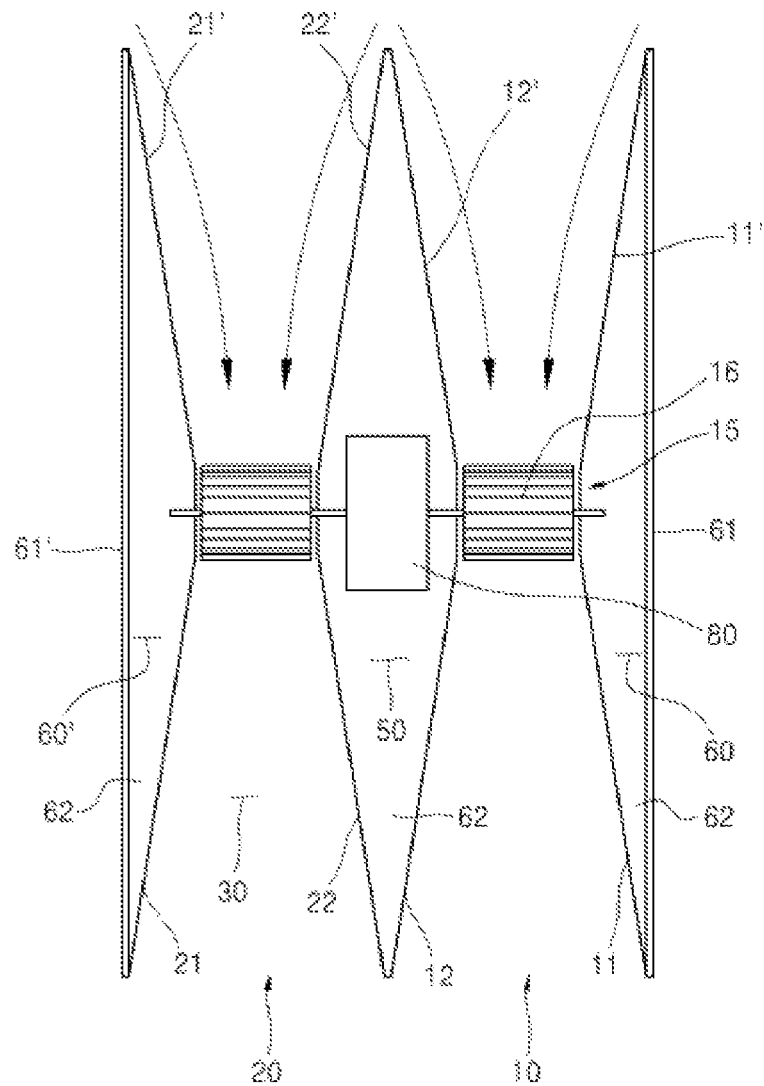
FIG. 2 is a view of the present device as viewed from the bottom of the floating body for tidal current power generation according to the present invention.

Accordingly, the V-shaped right inclined surfaces 11 and 11' and the right side surface 61, and the V-shaped left inclined surfaces 21 and 21' and the left side surface 61' may form triangular shapes as shown in FIG. 2, and the pair of V-shaped middle inclined surfaces 12 and 12' and 22 and 22' may form a diamond shape, and these shapes form bottom surfaces 62 covering the bottom. Of course, the bottom surfaces 62 may be formed in the same shape as the top surface 41, that is, in the rectangular shape, and thus cover the entirety of the bottom at once.

According to this configuration, the body part is closed by the top surface 41, the right side surface 61 and the left side surface 61', and the bottom surface, and has a space 40 formed therein, and the opened front surface or rear surface serve as tidal current inlets 10 and 20 to allow the tidal current to flow into the housing according to the direction of the tidal current.

Figure 3:
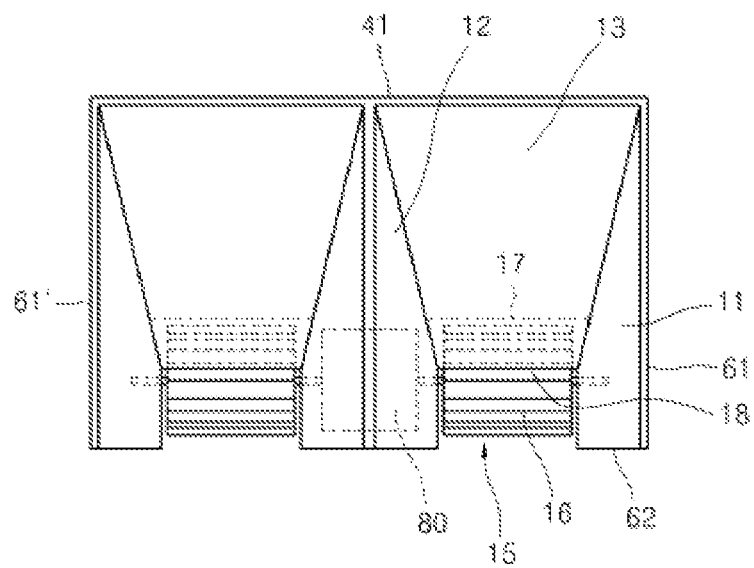
FIG. 3 is a front view of the floating body for tidal current power generation according to the present invention.

As described above, the front surface (or rear surface) of the present invention, shown in FIGS. 1 and 3, is formed to have two tidal current inlets 10 and 20 on the entire front surface. However, the tidal current inlets may be formed only on a part of the front surface (or rear surface) and the other surface may be closed to form a wall. In addition, various modified embodiments of the tidal current inlet are possible. For example, a single tidal current inlet may be formed or the tidal current inlet may be divided into a plurality of inlets.

As described above, the present invention is characterized in that the body part has the rectangular housing structure configured to have a tidal current inlet and outlet path 30 penetrating through the front and rear portions thereof, and the tidal current inlet and outlet path 30 is formed in a front-wide and rear-narrow shape, such that the tidal current inlets 10 and 20 are opened wide to expand the area into which the tidal current initially flows as much as possible, and the cross sectional area of the path is gradually reduced toward the center.

The space 40 formed by the above-described body part is formed as a single closed space surrounded by outer walls. Accordingly, the space 40 may be waterproofed when necessary and may be used as a ballast tank. In this case, a ballast water inlet and outlet (not shown) may be formed at an appropriation location of the body part to supply ballast water to the space 40 or discharge stored ballast water.

A plurality of sealed regions may be formed by installing a partition in the space 40, such that the sealed regions may serve as separate ballast tanks.

For example, when a partition 14 extending from the border of the top surface 41 is installed between the V-shaped right inclined surfaces 11 and 11' as shown in FIG. 1, a right side space 60 which is divided into sealed regions surrounded by the V-shaped right inclined surfaces 11 and 11', the partition 14, the right side surface 61, and the bottom surface 62 may be formed. A left side space 60' may be formed by installing a partition on the V-shaped left inclined surfaces 21 and 21' in the same way as shown in FIG. 2, and the other space eventually becomes a middle space 50.

In this way, the single space 40 may be divided into a plurality of small spaces, and each of the small spaces may be used as a separate ballast tank. Accordingly, an effect of adjusting the whole balance of the floating body for tidal current power generation by adjusting the amount of ballast water flowing into each of the spaces when necessary can be obtained.

The space formed in the body part may not be used as a ballast tank and a separate ballast tank may be accommodated in the space and used. In this case, a plurality of ballast tanks may be separately installed, and the shape of the ballast tank may be formed to correspond to the shape of the space. When the plurality of ballast tanks divided and the ballast tank formed to correspond to the shape of the space are used, the effect of adjusting the whole balance of the floating body for tidal current power generation by adjusting the amount of ballast water flowing into the ballast tanks can be easily achieved.

The power generation unit will be described with reference to FIGS. 2 and 3.

The power generation unit includes a water wheel 15, a power generation device 80, and a rotary shaft 70 connecting the water wheel 15 and the power generation device 80. The water wheel 15 includes a plurality of wings extending from the center of the rotary shaft 70 in a radial direction. The direction of the tidal current affecting the water wheel of the present invention is reversed when the tide is in and out, and accordingly, the rotation direction is changed. Therefore, the front surface and the rear surface of the wing may have the same shape.

The power generation device is operated about a driving shaft on the basis of the rotary shaft of the water wheel, and typically includes a boosting unit (not shown) for increasing the number of rotation of the water wheel and transmitting the power to a power generator, and the power generator (not shown). Since the power generation device is well known in the related-art, a detailed description thereof is omitted.

A connection relationship between the body part and the power generation unit will be described with reference to FIGS. 1 to 4.

As described in the embodiment illustrated in the drawings, the body part of the present invention includes the V-shaped upper inclined surfaces 13 and 13', the V-shaped right inclined surfaces 11 and 11', the pair of V-shaped middle inclined surfaces 12 and 12' and 22 and 22', and the V-shaped left inclined surfaces 21 and 21', and thereby form a pair of tidal current inlet and outlet paths 30 having a cross sectional area that is gradually reduced from the front surface and the rear surface toward the center of the body part. Through these paths, the tidal current flows in and out.

As well known, the direction of the tidal current is reversed when the tide is in and out. Accordingly, sea water may flow into the body part through the front surface or the rear surface according to the tidal current. In either case, it is preferable that the same hydraulic energy is transmitted to the water wheel. Accordingly, it is preferable that the water wheel 15 of the power generation unit is installed in the middle of the body part in the longitudinal direction, in other words, in the middle of the tidal current inlet and outlet paths 30.

In FIGS. 1 to 4, the rotary shaft 70 of the water wheel 15 is connected to the partition 14. However, this is merely example and rather it is common that a separate shaft support is installed on the bottom surface.

A cover body 17 may be formed on the top of the water wheel 15 as shown in FIGS. 3 and 4. The cover body 17 is formed to cover the top of the water wheel 15 from adjacent lines 18 and 18' where the upper inclined surfaces 13 and 13' shown in FIG. 1 meet the water wheel 15, in an arc shape, apart from the water wheel 15 by a predetermined gap as shown in FIG. 4. The space 40 is shielded by the cover body 17 from the tidal current.

As shown in FIG. 4, the bottom surface 62 of the body part is formed to be lower than a lowest point that the end of the wing 16 of the water wheel 15 reaches by L. This is to prevent any damage caused by contact of the wing 16 of the water wheel 15 with the bottom when the floating body for tidal current power generation of the present invention is brought into contact with bottom of the sea for some reasons such as a reduced water level.

In FIG. 2, the power generation device is installed in the middle space 50 formed between the pair of V-shaped middle inclined surfaces 12 and 12' and 22 and 22'. However, the location of the power generation device is not limited to this and may be changed to an appropriate location by a designer when necessary.

The operation of the floating body for tidal current power generation according to the present invention will be described with reference to FIGS. 1 to 4.

The floating body 100 for tidal current power generation of the present invention is floated on the sea such that the longitudinal direction of the tidal current inlet and outlet path 30 coincides with the flow direction of the tidal current, and is fixed in position using a fixing means such as an anchor cable or a fixing cable. In this case, an appropriate amount of ballast water is supplied to the space formed in the body part or the ballast tank and thereby adjusts the draft and balance of the floating body for tidal current power generation.

Thereafter, when the tide is in or out, the tidal current flows in from the front or rear of the floating body 100 for tidal current power generation through the tidal current inlets 10 and 20 of the body part.

The tidal current flowing in through the tidal current inlets 10 and 20 flows along the tidal current inlet and outlet path 30 which is wide at the entrance and the exit and has the cross sectional area that is gradually reduced toward the center where the water wheel 15 is installed. The speed of the tidal current passing through this path greatly increases near the water wheel 15, where the cross sectional area is reduced to the minimum, according to Bernoulli's principle, and accordingly, the rotation speed of the wing 16 of the water wheel increases. As a result, power generation efficiency is enhanced. In this case, when the bottom surface 62 of the body part extends to the lower portion of the tidal current inlet and outlet path 30 and the tidal current inlet and outlet path 30 becomes a path which is closed on the four sides, the effect of the Bernoulli's principle can be more obvious.

Since a process of driving the power generation device 80 connected via the rotary shaft 70 when the water wheel is rotated is well known, a detailed description thereof is omitted.

Hereinafter, a power generation method using a plurality of floating bodies 100 for tidal current power generation will be described with reference to FIGS. 5 and 6.

Figure 5:
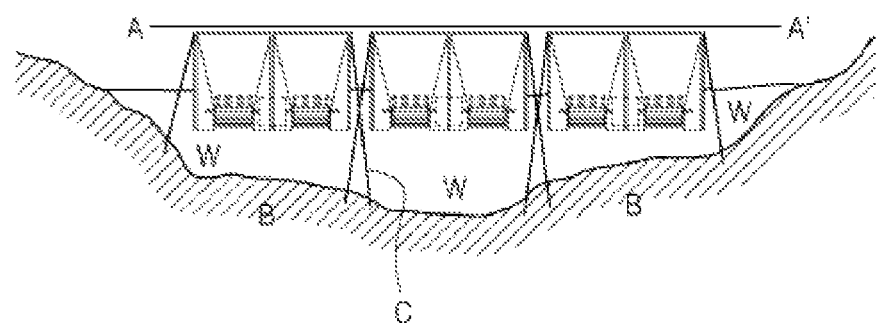
FIG. 5 is a view showing floating bodies for tidal current power generation installed when the tidal current is strong according to the present invention.

FIG. 5 illustrates a plurality of floating bodies 100 for tidal current power generation, which are installed in parallel across a narrow strait, while filling the entire width of the strait and maintaining a minimum gap therebetween. For reference, the Uldolmok strait has a minimum width of about 300 meters and an average width of about 500 meters, and the floating body for tidal current power generation of the present invention can be manufactured to have a width of tens of meters or more, and thus it is quite possible to put this parallel arrangement to practical use.

When the speed of the tidal current is fast since the tide is in and out, a large number of rotation of the water wheel can be obtained due to the tidal current. Therefore, the floating bodies for tidal current power generation are simply fixed to have the top surfaces in parallel with line A-A' as shown in FIG. 5.

However, since the speed of the tidal current becomes slower during one or two hours before or after the time of stand of tide, the water wheel is not rotated at high speed and power generation is not smoothly performed.

In this case, a draft is increased by supplying ballast water to the floating bodies for tidal current power generation. As shown in FIG. 6, since the distance from the sea level to the bottom of the sea varies according to the topographical features of a terrain where the floating bodies for tidal current power generation are arranged, the drafts of the floating bodies for dial current power generation may be differently set.

Figure 6:
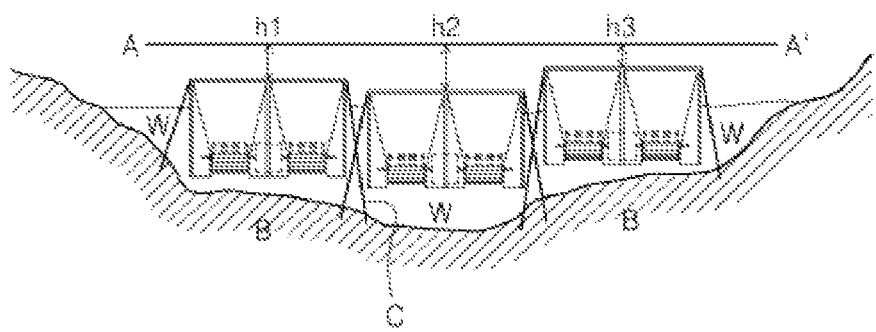
FIG. 6 is a view showing floating bodies for tidal current power generation installed when the tidal current is weak according to the present invention.

That is, when the floating bodies for tidal current power generation may be fixed by moving down the top surfaces of the floating bodies from initial line A-A' by h1, h2, and h3, respectively, in consideration of the sea floor terrain, as shown in FIG. 6, the floating bodies for tidal current power generation almost blocks the total width of the strait. Accordingly, a cross sectional area through the tidal current passes is greatly reduced in comparison to the case of FIG. 5, and the speed of the tidal current passing through this area greatly increases.

In this way, the speed of the tidal current can be artificially increased at the time of stand of tide when the speed of the tidal current becomes slow. Therefore, times that power can be generated can be maximized and the amount of power generated can be increased.

Sings B, C, and W, which have not been described, indicate the ocean floor, the anchor cable, and sea water, respectively.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and should be understood as included the spirit of the present invention defined in the appended claims and variants or equivalents existing in the range thereof.

What is claimed is:

1. A floating body for tidal current power generation, comprising:
   a power generation unit comprising a millwheel shaped water wheel and a power generation device connected to the millwheel shaped water wheel, the millwheel shaped water wheel including a plurality of wings extending from a center of a rotary shaft of the millwheel shaped water wheel in a radial direction;
   a body part comprising a tidal current inlet-outlet path having a cross sectional area that is gradually reduced from the front and rear surfaces of the tidal current inlet-outlet path toward the millwheel shaped water wheel, the body part including: V-shaped upper inclined surfaces which protrude downwardly from upper portions of the body part toward a center of a housing shape of the body part; V-shaped right inclined surfaces which protrude inwardly from right sides of the body part toward the center of the housing shape; a pair of V-shaped middle inclined surfaces which protrude inwardly from a middle of the body part toward the center of the housing shape; and V-shaped left inclined surfaces which protrude inwardly from left sides of the body part toward the center of the housing shape; and
   a cover body formed at a top of the millwheel shaped water wheel in an arc shape to cover an upper part of the millwheel shaped water wheel in the arc shape from adjacent lines where the V-shaped upper inclined surfaces of the body part meet the millwheel shaped water wheel apart from the millwheel shaped water wheel by a predetermined gap.

2. The floating body of claim 1, wherein the body part further comprises:
   a space formed in the body part to store ballast water and shielded by the cover body from tidal current.

3. The floating body of claim 2, wherein the space is divided into a plurality of sealed regions to allow ballast water to flow in and out independently.

4. The floating body of claim 1, wherein the body part is configured to have a bottom surface located lower than a lowest location of the millwheel shaped water wheel by a predetermined length.

5. A power generation method using a floating body for tidal current power generation, the method comprising:

arranging a plurality of floating bodies in parallel so that a longitudinal direction of a tidal current inlet-outlet path coincides with a direction of tidal current, each of the floating bodies comprising: a power generation unit comprising a millwheel shaped water wheel and a power generation device connected to the millwheel shaped water wheel; a body part comprising the tidal current inlet-outlet path which is formed from front and rear surfaces of the tidal current inlet-outlet path toward the millwheel shaped water wheel, the body part including: V-shaped upper inclined surfaces which protrude downwardly from upper portions of the body part toward a center of a housing shape of the body part; V-shaped right inclined surfaces which protrude inwardly from right sides of the body part toward the center of the housing shape; a pair of V-shaped middle inclined surfaces and which protrude inwardly from a middle of the body part toward the center of the housing shape; and V-shaped left inclined surfaces which protrude inwardly from left sides of the body part toward the center of the housing shape;

a cover body formed at a top of the millwheel shaped water wheel in an arc shape to cover an upper part of the millwheel shaped water wheel in the arc shape from adjacent lines where the V-shaped upper inclined surfaces of the body part meet the millwheel shaped water wheel apart from the millwheel shaped water wheel by a predetermined gap; and adjusting drafts of the floating bodies for tidal current power generation according to a flow speed of the tidal current.

* * * * *